United States Patent
World et al.

(10) Patent No.: US 12,502,810 B2
(45) Date of Patent: Dec. 23, 2025

(54) RODSTOCK DRIVE ASSEMBLY

(71) Applicant: Rolls-Royce plc, London (GB)

(72) Inventors: Kevin M. World, Bristol (GB); Simon Groves, Bristol (GB); Wojciech Wasinski, Bristol (GB)

(73) Assignee: Rolls-Royce PLC, London (GB)

( * ) Notice: Subject to any disclaimer, the term of this patent is extended or adjusted under 35 U.S.C. 154(b) by 287 days.

(21) Appl. No.: 18/475,576

(22) Filed: Sep. 27, 2023

(65) Prior Publication Data

US 2024/0123655 A1   Apr. 18, 2024

(30) Foreign Application Priority Data

Oct. 18, 2022  (GB) ...................................... 2215385

(51) Int. Cl.
*B29C 31/08*   (2006.01)
*B29C 70/26*   (2006.01)

(52) U.S. Cl.
CPC .............. *B29C 31/08* (2013.01); *B29C 70/26* (2013.01)

(58) Field of Classification Search
CPC ................................ B29C 31/08; B29C 70/26
See application file for complete search history.

(56) References Cited

U.S. PATENT DOCUMENTS

2006/0043138 A1   3/2006  Daniel et al.
2015/0202666 A1   7/2015  Zink

FOREIGN PATENT DOCUMENTS

| CN | 110699840 A | 1/2020 |
|---|---|---|
| CN | 212125737 U | 12/2020 |
| CN | 113600717 A | 11/2021 |
| CN | 114645373 A | 6/2022 |
| EP | 2581201 B1 | 12/2016 |
| WO | 0026012 A1 | 5/2000 |
| WO | 2018106453 A1 | 6/2018 |

OTHER PUBLICATIONS

Great Britain search report dated Apr. 14, 2023, issued in GB Patent Application No. 2215385.2.
Hirono, M. et al, Controls and Drives of Coil Feeder for Hot-Formers, , Sep. 28, 1991, IEEE.
European search report dated Mar. 22, 2024, issued in EP Patent Application No. 23198791.8.

*Primary Examiner* — Michelle Lopez

(57) ABSTRACT

A rodstock barrel drive having a first and second roller gears, each having a toothed section and a gripping surface section, such that the teeth of the roller gears intermesh, causing rotation of one of roller gear to rotate the other roller gear in the opposite direction, so as to draw a rodstock through a space between the gripping surfaces of the pair of roller gears, a ring gear which engages with one of the pair of roller gears, a drive gear which engages with the ring gear, and one or more idler gears which engage with the ring gear, all within a housing, the drive gear being connected to, and rotated by, a motor, which causes the rodstock to be drawn through the roller gears, wherein all the gears are all positioned within, and oriented parallel to, a common plane.

8 Claims, 11 Drawing Sheets

RODSTOCK DRIVE ASSEMBLY

CROSS-REFERENCE TO RELATED APPLICATIONS

This specification is based upon and claims the benefit of priority from UK Patent Application Number GB 2215385.2 filed on 18 Oct. 2022, the entire contents of which are incorporated herein by reference.

BACKGROUND

Technical Field

The present disclosure relates to a rodstock drive assembly for inserting rodstock into a composite material.

Description of the Related Prior Art

Composite materials have a large range of applications, especially in high-tech industries where their combination of strength and light weight make them particularly useful. In the aerospace industry, composite materials are being researched for a number of different uses, including fan, turbine, and compressor blades. In such blades, the composite material is built up in layers until the desired volume of material is reached. Whilst parts made using composite materials in this way are generally strong, the bonding between layers is not as strong as the bonding within a layer. To improve the strength of the bond between layers, it is known to place pins through the layers of the composite component, as (for example) described in European Patent 2581201 B1. In order to place the pins through the layers of composite material, it is advisable to first create holes in the composite material into which the pins will be placed. Needle drive assemblies are known for creating arrays of such holes, as to create the holes one at a time would be a very time consuming process. In a known example of such a device, a plurality of needles are fed into the composite material, pushing aside the fibres and the resin of the composite material to form a hole into which pins, or rodstock, can be inserted.

It is advantageous to be able to insert the rodstock to different depths within the composite component, for example to provide different depths of pinning between the composite layers in different areas of the component, or to provide pinning through the same proportional depth of a component which has different thicknesses in different regions. In the absence of such control, where the rodstocks all have to be inserted by the same distance, the maximum depth of insertion for the whole array of rodstocks will be governed by for example, the minimum thickness of the component in the region being pinned.

There is therefore a need for a device capable of feeding rodstocks within a rodstock array to different depths within a composite component.

SUMMARY

According to a first aspect there is provided a rodstock barrel drive for feeding rodstock in a rodstock drive assembly comprising a housing, the housing containing a first roller gear and a second roller gear, the first and second roller gears each having a first toothed circumferential section, and a second circumferential section with a gripping surface such that, when installed within the housing, the teeth of the first circumferential sections of the roller gears intermesh such that rotation of one of roller gear causes rotation of the other roller gear in the opposite direction, and the second circumferential sections are configured to grip a rodstock between them so as to draw a rodstock through the space between the pair of roller gears when the roller gears rotate. The housing further contains a ring gear which engages with one of the pair of roller gears, a drive gear which engages with the ring gear, and one or more idler gears which engage with the ring gear. The rodstock barrel drive also has a motor connected to the drive gear such that, upon activation, the motor rotates the drive gear, which rotates the ring gear, which rotates the pair of roller gears, which draws a rodstock through the roller gears. The first roller gear, second roller gear, ring gear, drive gear, and the one or more idler gears are all positioned within, and oriented parallel to, a common plane.

Such a rodstock barrel drive provides precise control over the position of a rodstock. Such a rodstock barrel drive also allows for a high packing density of rodstock barrel drives where multiple rodstock barrel drives are required or desired.

The rodstock barrel drive may optionally have at least one of the pair of roller gears is mounted on a sprung tensioner. Mounting at least one of the pair of roller gears on a sprung tensioner can improve the ability of the first roller gear and the second roller gear to grip the rodstock between them.

The rodstock barrel drive may have the drive gear positioned within the circumference of the ring gear. The rodstock barrel drive may have one or more of the one or more idler gears positioned within the circumference of the ring gear. Having the drive gear positioned within the ring gear means only a single idler gear positioned within the circumference of the ring gear is required to keep the ring gear fixed about a particular axis of rotation. Positioning the drive gear and the one or more idler gears within the circumference of the ring gear further reduces the footprint of the rodstock barrel drive.

According to a second aspect there is provided a rodstock barrel drive system comprising at least a first and second rodstock barrel drives according to the first aspect. Such a rodstock barrel drive system is capable of accurately positioning multiple rodstocks simultaneously. Such a system is particularly suited for use where multiple rodstocks need to be closely positioned, as the rodstock barrel drives can be packed closely together.

The rodstock barrel drive system may have the first and second rodstock barrel drives aligned such that the ring gear of the first rodstock barrel drive and the ring gear of the second rodstock barrel drive share a common rotational axis. Such a rodstock barrel drive system is simple to construct as the ring gear is in the same location for each of the rodstock barrel drives in the rodstock barrel drive system.

The rodstock barrel drive system may have at least a first and second motor, the first and second motors being mounted exterior to a housing of the first barrel drive, the first motor being connected to the drive gear in the first barrel drive by a first spindle, and the second motor being connected to the drive gear in the second barrel drive by a second spindle, wherein the second spindle passes through the housing of the first barrel drive to connect with the drive gear within the housing of the second barrel drive. Such an arrangement allows for an even higher packing density of rodstock barrel drives in the barrel drive system, as the motors can be placed at one end of the stack instead of requiring space between each rodstock barrel drive in the stack for attaching a motor.

According to a third aspect there is provided a rodstock barrel drive assembly comprising at least a first rodstock barrel drive system according to any one of claims 5, 6, and 7 and second rodstock barrel drive system according to any one of claims 5, 6, and 7. Such an assembly can be used to accurate insert multiple rodstocks into a material, such as a composite material, with the insertion depth of each rodstock being individually controllable and measurable.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
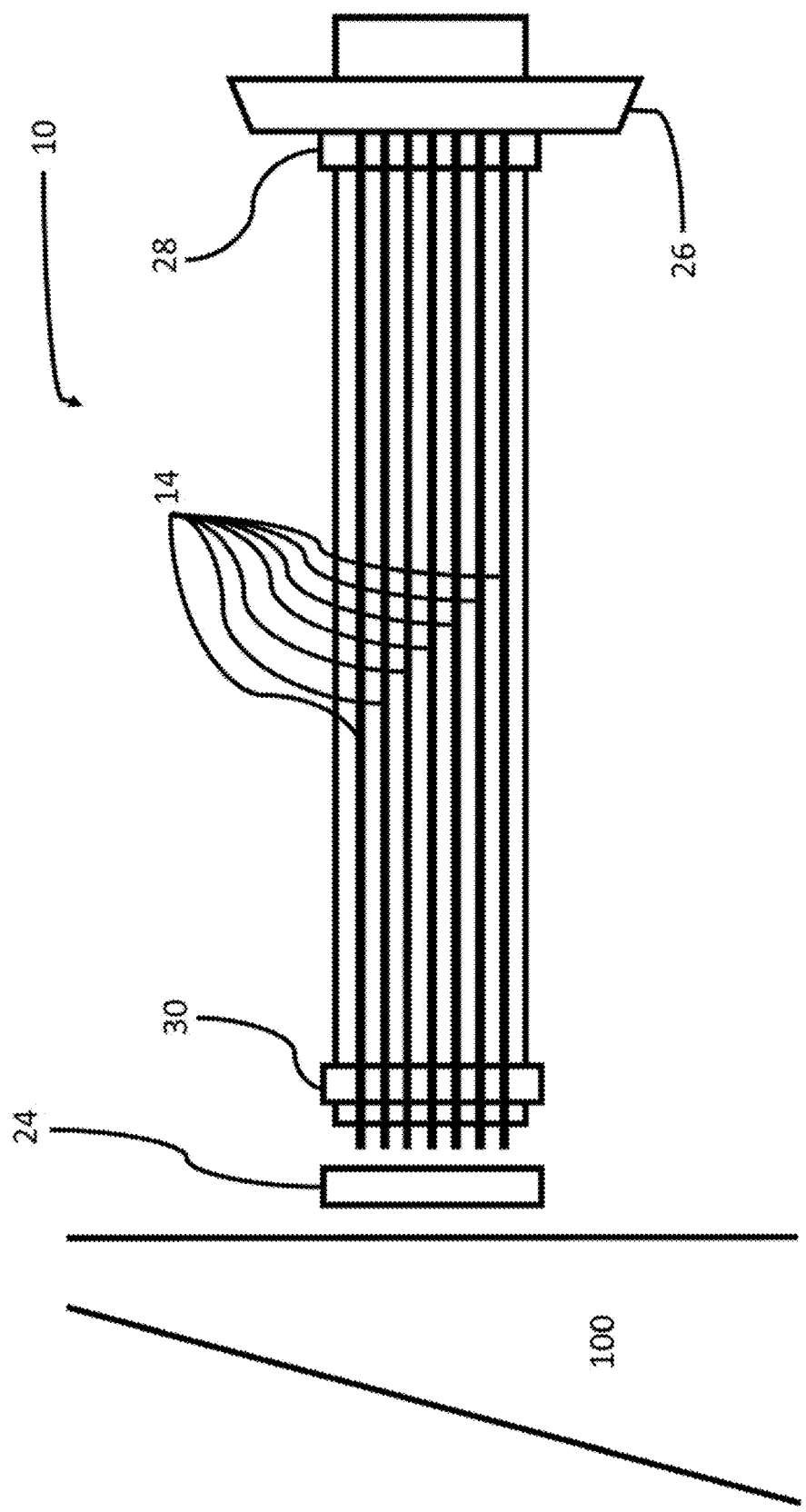
FIG. 1 is a schematic view of a known rodstock drive assembly.

With reference to FIG. 1, a schematic of a known rodstock drive assembly 10 is shown along with a piece of composite material 100 into which the rodstock is to be inserted. The known rodstock drive assembly 10 has a holder 20, to which is attached a ram 26, an upper clamp 28 and a lower clamp 30. A foot 24 is positioned close to the surface of the composite material to act as a final guide for the rodstocks prior to insertion into the composite material. The known rodstock drive assembly holds a number of rodstocks 14—in this case seven rodstocks are shown, but the number may be fewer, such as one or two needle systems, or greater—for example twelve, twenty-four, thirty-six, forty-eight, or sixty-four needle system, depending on the application, or the size of the composite component being worked on. It should also be noted that whilst for clarity FIG. 1 is shown with an array of rodstocks in a single plane (i.e. a 1×7 array), it is possible for the rodstocks to be arranged in multiple planes. For example, the rodstocks may be arranged in a grid pattern, so as to create an array of rodstocks, for example a 3×4 array (12 rodstocks), a 4×6 array (24 rodstocks), an 8×6 array (48 rodstocks), or an 8×12 array (96 rodstocks). An example of a foot, or upper clamp, or lower clamp configured for a 6×4 array of rodstocks in shown in FIG. 4. Each rodstock is guided by a sleeve (not shown) which helps prevent the rodstock from bending, especially when it is being inserted into the composite component. Such arrays of rodstocks will be known to the person skilled in the art.

FIG. 1 shows the known rodstock drive assembly in a first configuration prior to insertion into a composite material 100. The rodstocks are held at one end by the upper clamp 28, whilst at the end of the rodstocks nearest to the foot 24 the lower clamp 30 is deactivated to allow the rodstocks to pass through it.

Figure 2:
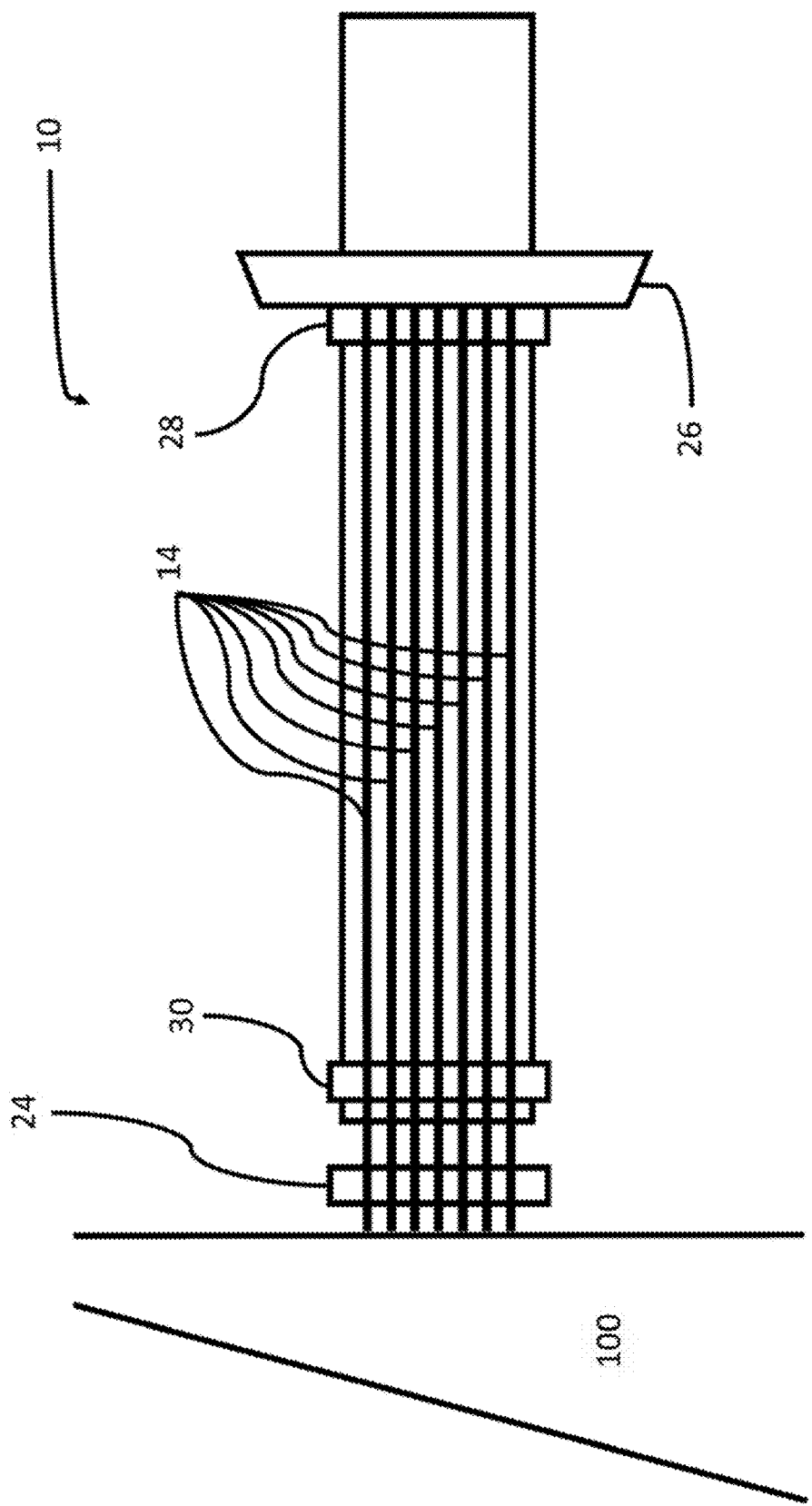
FIG. 2 is a schematic view of a known rodstock assembly.

FIG. 2 shows the known rodstock drive assembly where the ram 26 has been moved towards the composite material, pushing the upper clamp 28 along with it, and feeding the rodstocks 14 through the foot 24 into contact with the composite material 100. The ram arrangement means the rodstocks are all advanced towards the composite material by the same distance.

Figure 3:
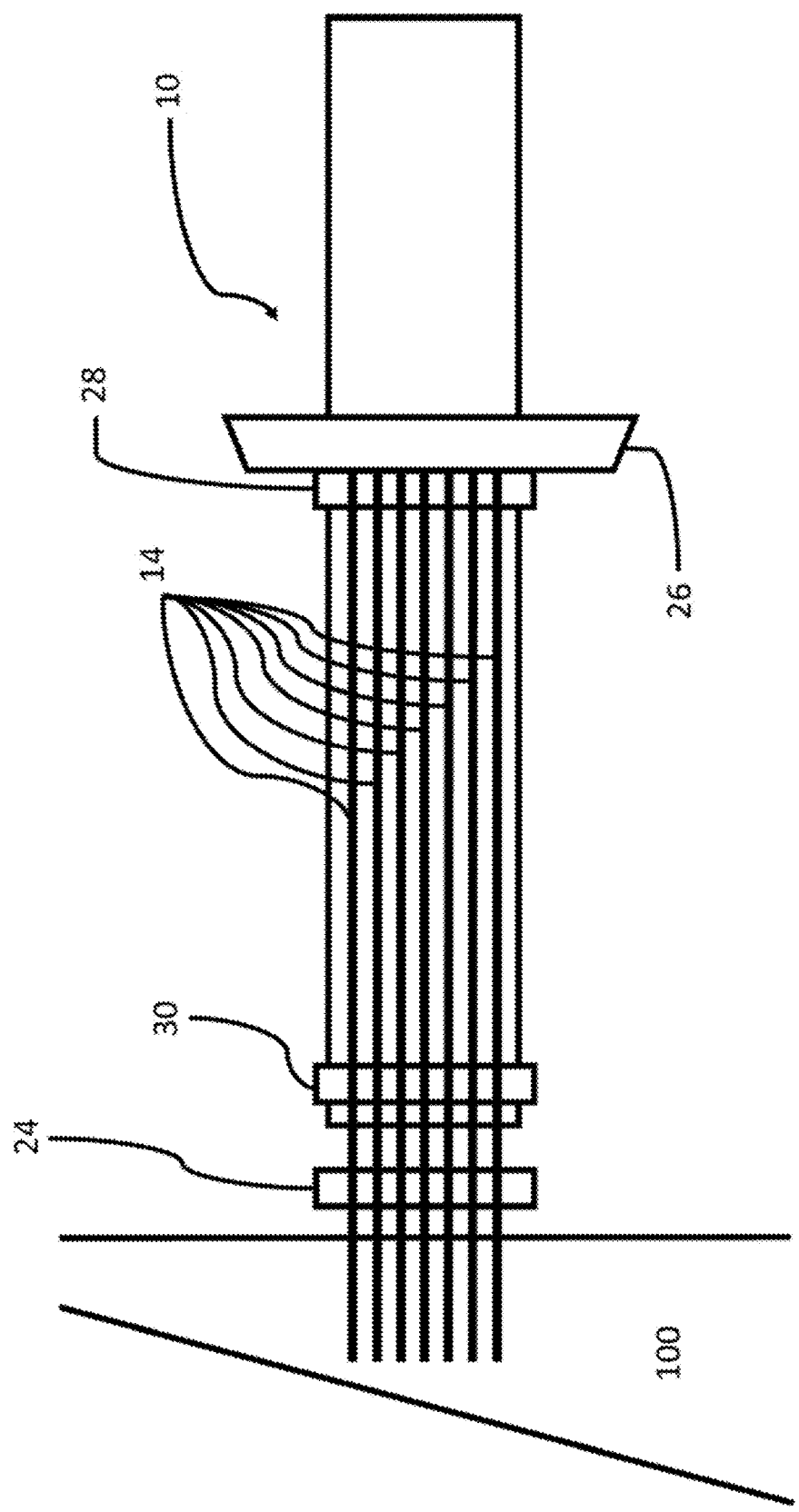
FIG. 3 is a schematic view of a rodstock drive assembly according to the present disclosure.

FIG. 3 shows the known rodstock drive assembly where the ram 26 has been moved further towards the composite material, such that the rodstock has been fed into the holes (not shown) made in the composite material by needles. At this point, when the rodstocks have reached the target depth, the lower clamp 30 is engaged and the upper clamp 28 is disengaged so that the ram 26 and upper clamp can be withdrawn. As shown in FIG. 3, because the region of the composite material the rodstock is being inserted into does not have a consistent thickness, the rodstocks penetrate to different depths through the composite material as a fraction of the composite material's depth. This may result for example in some layers of the composite material being pinned in one region where the composite material is thinner, but not in other regions where the composite material is thicker. Where the layers are not pinned, the risk of delamination when the composite material experiences an impact force is increased.

Figure 4:
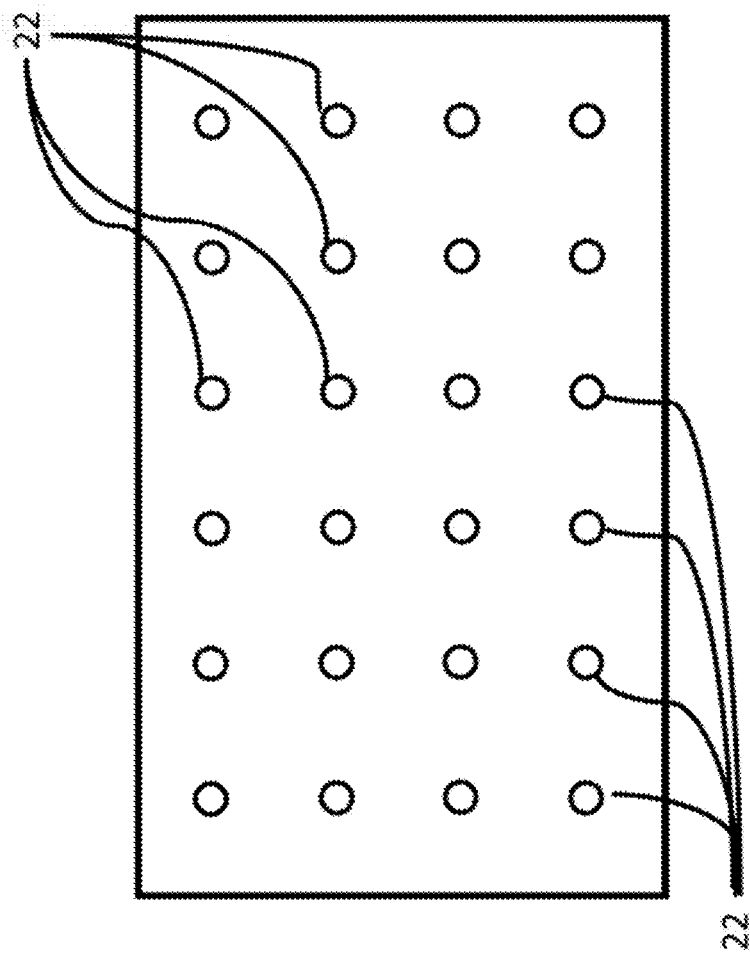
FIG. 4 is a plan view of an exemplary embodiment of a foot, or upper clamp, or lower clamp.

FIG. 4 shows a plan view of an exemplary embodiment of the foot 24, or upper clamp 26, or lower clamp 30 which would be used with a 6×4 array of rodstocks, either with the known rodstock drive assembly 10 or with the rodstock drive assembly 70 of the present disclosure. The foot 24, or upper clamp 26, or lower clamp 30 has an array of guidance holes 22, through each of which first a sleeve is passed (not shown), with the rodstocks then being passed through the sleeves.

Figure 5:
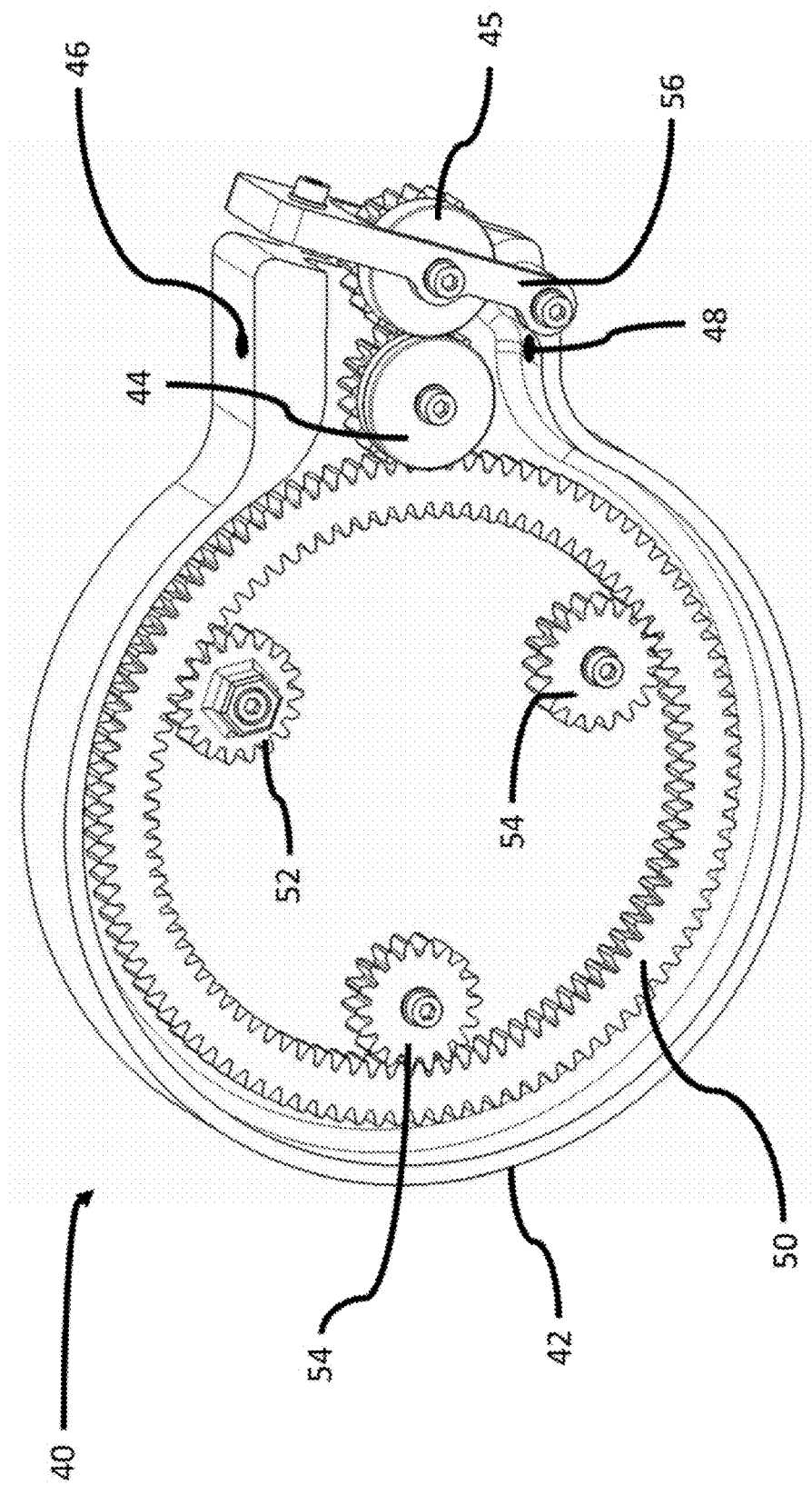
FIG. 5 is a isometric view of a rodstock drive assembly according to the present disclosure.

FIG. 5 shows a barrel drive 40 according to the present disclosure. The barrel drive has a housing 42, within which there is a pair of roller gears 44, 45, consisting of a first roller gear 44 and a second roller gear 45. The second roller gear 45 is mounted on a sprung tensioner 56. The function of the sprung tensioner 56 is to improve the ability of the first roller gear 44 and the second roller gear 45 to grip a rodstock (not shown) between them, by applying a variable compressing force between the pair of roller gears. It will be appreciated that the sprung tensioner could take any one of a number of suitable forms, such as a leaf spring, coil spring, or other resistive element as known to the person skilled in the art.

Each of the roller gears 44, 45 has a first toothed circumferential section, i.e. a cog-like surface, extending 360 degrees around its circumferential surface. Each of the roller gears also has a second circumferential section with a gripping surface (the non-toothed part of the circumferential surface shown on the roller gears in FIG. 5), which also extends 360 degrees around its circumferential surface next to the first toothed circumferential section. The gripping quality of the gripping surface is achieved by means known in the art, for example, surface roughening or deposition of particulates to the surface to as to create a rough, gripping surface. The pair of roller gears 44, 45 are installed within the housing so that their teeth intermesh, meaning that rotation of one of roller gears will cause the other roller gear to rotate in the opposite direction. The second circumferential sections of the roller gears with the gripping surfaces have enough space between them to enable a rodstock (not shown) to pass between them. In this example embodiment, the rodstock would enter the housing 42 via a first aperture 46, pass between the gripping surfaces of the pair of roller gears, and then exit the housing via a second aperture 48 opposed to the first aperture. As explained above, when one of the roller gears turns, the other roller gear will turn in the opposite direction, meaning the rodstock, which will be gripped between the roller gears, will be fed between them in one direction or another, depending on which way the roller gears are rotating.

Figure 6:
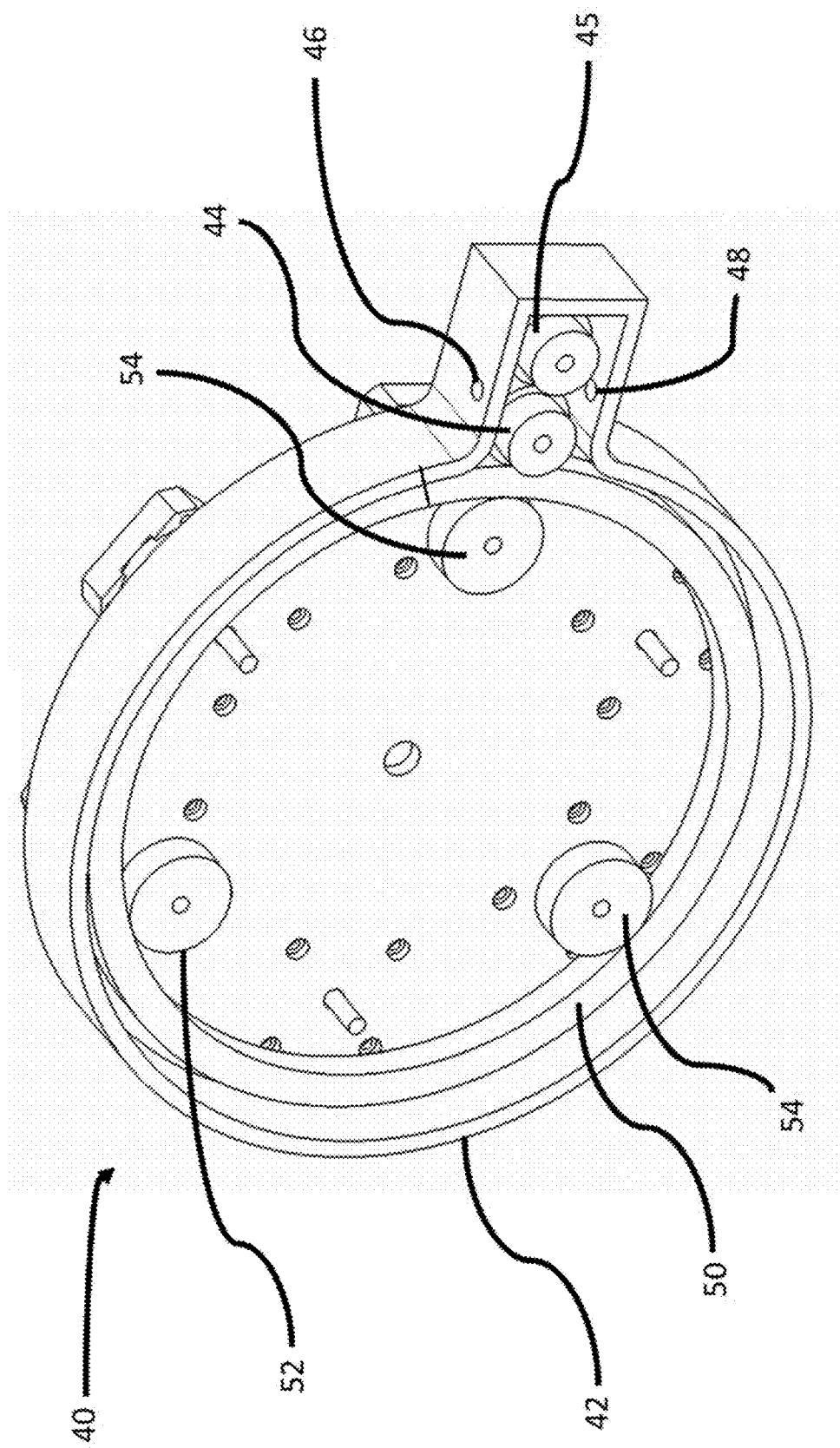
FIG. 6 is a second isometric view of a rodstock drive assembly according to the present disclosure.

The housing 42 also contains a ring gear 50, which also has a toothed surface extending 360 degrees around at least its exterior circumferential surface. In the rodstock barrel drive configuration of FIGS. 5 and 6 (although the toothed surface is not shown in FIG. 6), both the interior and exterior circumferential surfaces will have a series of teeth extending 360 degrees around a portion of the ring gear's surface. In the configurations of FIGS. 5 and 6, the teeth of the exterior circumferential surface will engage with the teeth of a first roller gear 44, such that when the ring gear 50 rotates, the first roller gear 44 also rotates, but in the opposite direction.

The housing 42 also contains a drive gear 52, which also has a toothed surface extending 360 degrees around at least its exterior circumferential surface. The drive gear is connected to a first motor 82 (see FIG. 7), such that when the first motor is activated it can rotate the drive gear clockwise or counter-clockwise. In the configuration shown in FIG. 5, in order to reduce the volume of the barrel drive, the first drive gear 52 engages with the interior surface of the ring gear 50. It will however be appreciated other configurations are possible where the first drive gear is positioned outside of the ring gear and engages with the exterior surface of the ring gear.

The housing 42 also contains at least one idler gear 54. The at least one idler gear has a toothed surface extending 360 degrees around its exterior circumferential surface, in a cog-like fashion. The teeth on the exterior surface of the idler gear engage with the teeth on the surface of the ring gear. The at least one idler gear works in cooperation with the first drive gear to keep the ring gear's axis of rotation fixed. In the configuration shown in FIG. 5, two idler gears are shown, but it will be appreciated the ring gear's axis of rotation can be fixed using just a single idler gear in combination with the drive gear (i.e. by placing the idler gear at 180 degrees to (i.e. directly opposite the drive gear with respect to the ring gear's axis of rotation) the drive gear when both the idler gear and drive gears are positioned inside of the ring gear), or more than two idler gears, if greater load distribution is required, for example.

The arrangement of gears within the housing and the connection of the drive gear to the motor means that, when the motor is activated, it rotates the drive gear, which in turn rotates the ring gear, which in turn rotates the pair of roller gears, which draws a rodstock through the roller gears.

As can be seen from FIGS. 5 and 6, the pair of roller gears 44, 45, the ring gear 50, the drive gear 52, and the one or more idler gears 54 are all positioned within, and oriented parallel to, a common plane within the rodstock barrel drive 40, which is to say the toothed surfaces of the pair of roller gears 44, 45, the ring gear 50, the drive gear 52, and the one or more idler gears 54 are oriented perpendicular to the common plane that the pair of roller gears 44, 45, the ring gear 50, the drive gear 52, and the one or more idler gears 54 are arranged in. As such, the rodstock barrel drive can occupy a small volumetric footprint, or have a small profile, in the region around the rodstock when the rodstock is passed between the roller gears 44, 45. This is advantageous, as it allows for a high packing density of rodstock barrel drives where multiple rodstock barrel drives are required, as shall be explained with reference to FIGS. 7 and 8.

FIG. 6 shows an alternative embodiment of the barrel drive of the present disclosure. It is to be understood that while FIG. 6 does not show the toothed surfaces of FIG. 5, they are none-the-less present in the same locations. The main difference between the embodiment shown in FIG. 5 and that of FIG. 6 is that the second roller gear 45 is not mounted upon a sprung tensioner 56, but rather it is mounted in a fixed position within the housing 42. The gap between the pair of roller gears 44, 45 through which the rodstock can pass is just wide enough that the gripping surfaces of the roller gears can contact and grip the rodstock so that the roller gears can control the rodstock's movement between them.

FIG. 6 also differs from FIG. 5 in that the locations of the drive gear 52 and the one or more idler gears 54 changed, with two idler gears 54 being shown in FIG. 6. The exact locations of the drive gear and idler gears can vary (as shown in FIG. 7), providing they are able to perform the functions of driving the ring gear, and keeping the ring gear's axis of rotation fixed within the housing 42.

Figure 7:
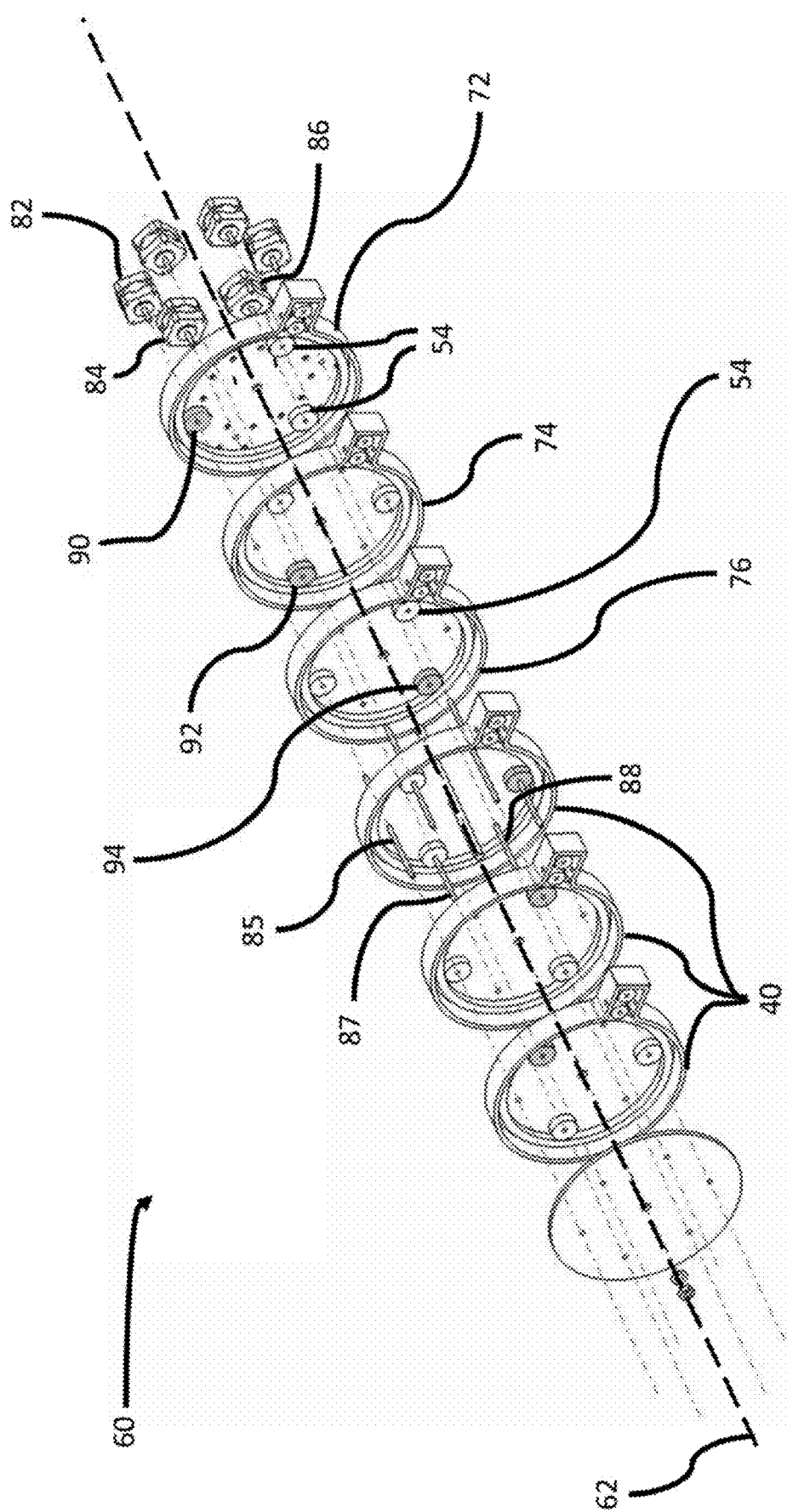
FIG. 7 is an exploded view of a rodstock barrel drive system according to a second aspect of the disclosure.

FIG. 7 shows an exploded view of an example of a rodstock barrel drive system 60 according to a second aspect of the present disclosure. The rodstock barrel drive system 60 comprises a plurality of rodstock barrel drives 40, 72, 74, 76, which are aligned with each other so that the ring gears 50 within the rodstock barrel drives all share a common rotational axis 62. It will be appreciated that this is not an essential feature of the design (it is possible to create a rodstock barrel drive system where the ring gears do not share a common rotational axis, using the same motor and spindle arrangement, but with the drive gear and/or one or more idler gears of some rodstock barrel drives being inside the circumference of the ring gear, interacting with the interior toothed surface of the ring gear, and for other rodstock barrel drives within the rodstock barrel drive system the drive gear and/or one or more idler gears being outside the circumference of the ring gear, interacting with the exterior toothed surface of the ring gear), but does greatly simplify the construction and operation of the rodstock barrel drive system, as will become apparent.

At one end of the plurality of rodstock barrel drives are mounted a series of motors 82, 84, 86 one for each rodstock barrel drive in the rodstock barrel drive assembly. In the example shown in FIG. 7, there are six motors for six barrel drives 72, 74, 76, 40. A first motor 82 is connected to a first drive gear 90 in a first barrel drive 72, closest to the motors, for example by via a first spindle 85. A second motor 84 is connected to a second drive gear 92 in the next closest rodstock barrel drive (second rodstock barrel drive 74) via a second spindle 87 which passes through the first rodstock barrel drive 72 into the second rodstock barrel drive 74. This is achieved by having the second drive gear 92 in the second rodstock barrel drive 74 in a different circumferential location compared to the first motor 82 in the rodstock first barrel drive 72. Specifically, the second motor 84 has been moved round the common rotational axis of the ring gears 62 so as to be positioned at a different angle with respect to the common rotational axis of the ring gears. The one or more idler gears 54 can also be moved to maintain the same angular distribution around the common rotational axis of the ring gears. A third motor 86 can be connected to a third drive gear 94 in a third rodstock barrel drive 76 via a third spindle 88 passed through both the first 72 and second 74 rodstock barrel drives, again positioned at a different circumferential location with respect to the common rotational axis of the ring gears to the first 82 and second motors 84, and so on, to create a rodstock barrel drive assembly of n rodstock barrel drives with n motors used to activate the gears in each barrel drive.

By combining a series of rodstock barrel drives in this manner, a number of rodstocks equal to the number of rodstock barrel drives can be moved, with the movement of each rodstock being individually controllable.

Figure 8:
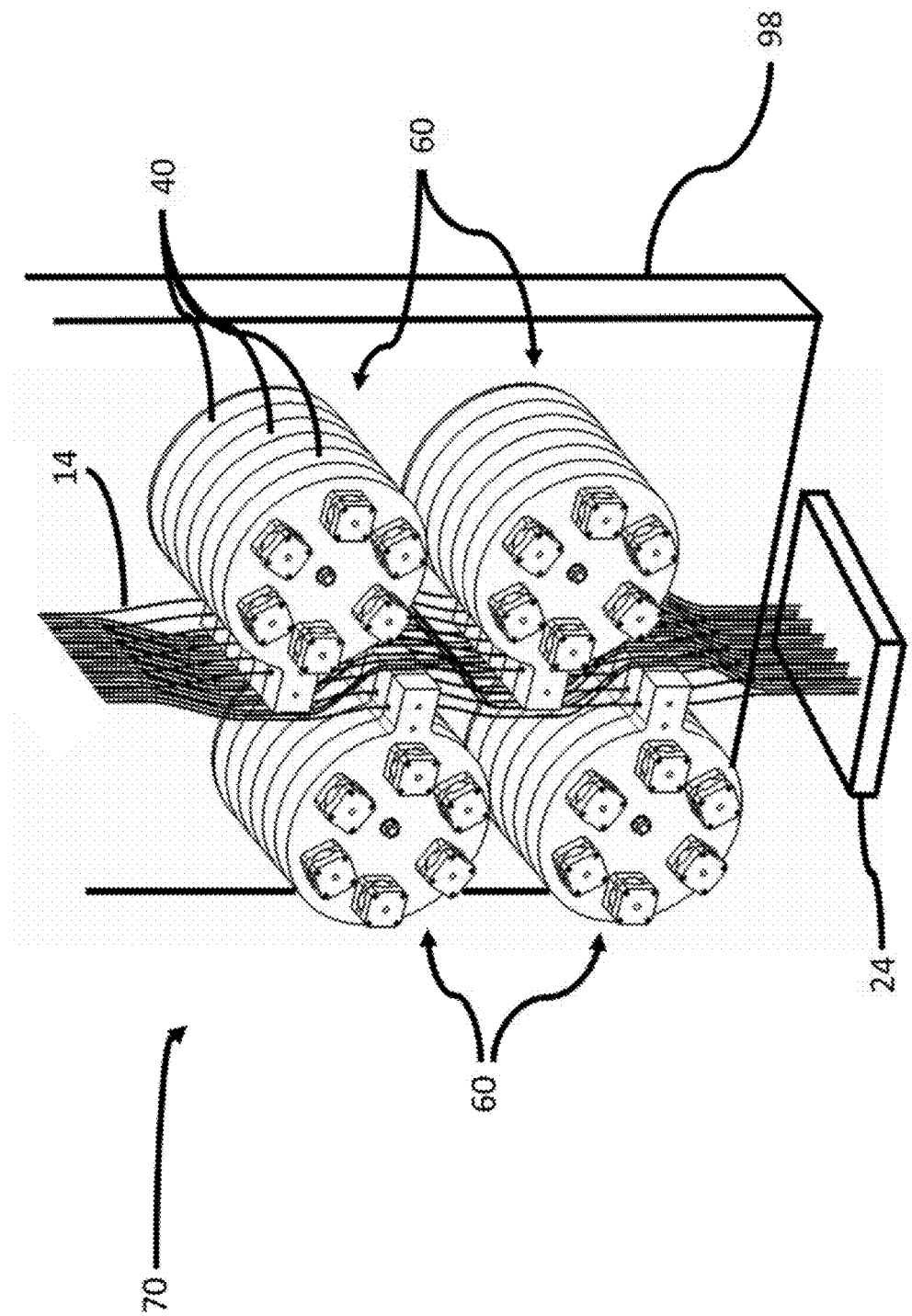
FIG. 8 is an isometric view of a barrel drive assembly according to a third aspect of the disclosure.

FIG. 8 shows an example of a rodstock barrel drive assembly 70 according to a third aspect of the present disclosure. The rodstock barrel drive assembly 70 is made up of a plurality of rodstock barrel drive systems 60, mounted to a system mount 98. In this example, each rodstock barrel drive system comprises six rodstock barrel drives 40, and is therefore capable of moving six rodstocks 14. The rodstock barrel drive systems 60 are stacked to the left and right of a series of rodstocks 14 which pass between the rodstock barrel drive systems, each rodstock passing through one of the rodstock barrel drives between the top of the rodstock barrel drive assembly to the bottom of the rodstock barrel drive assembly (i.e. towards the foot 24). In the example shown, the rodstock barrel drive assembly has four rodstock barrel drive systems 60, each rodstock barrel drive system comprising six rodstock barrel drives, meaning the movement of a total of 24 rodstocks can be controlled by the rodstock barrel drive assembly. It will be appreciated that the configuration of the system can be altered depending on the number of rodstocks the rodstock barrel drive assembly needs to control. For example, the number of rodstock barrel drives in each rodstock barrel drive system could be changed by adding or subtracting rodstock barrel drives to one or more of the rodstock barrel drive systems. The skilled person will appreciate this can be done by adding or subtracting motors and spindles providing there is room within the housing to fit the spindles, drive gears 52 and idler gears 54. Equally, the number of rodstock barrel drive systems 60 can be adapted by removing rodstock barrel drive systems or by adding more above or below the existing rodstock barrel drive systems.

The small footprint of each rodstock barrel drive allows for a high packing density of rodstock barrel drives on the system mount 98. By attaching the rodstock barrel drives to the system mount 98, the user can move each rodstock individually using the individual rodstock barrel drives, and move all of the rodstocks simultaneously by moving the system mount upon which all of the rodstock barrel drives are mounted.

Such a rodstock barrel drive assembly allows for alternative methods of pinning a composite component which has had pinning holes made in it.

For example, the rodstock barrel drives can be used to align the end of all the rodstocks so that they are all level, before using the holder to advance the rodstocks through the foot 24 (not shown in FIG. 8) and into the composite material, equivalent to the procedure shown in FIGS. 1, 2 and 3 with respect to the known rodstock drive assembly. As stated previously, this method has the disadvantage of not being able to account for different pinning depths within the composite component. An alternative method which solves this issue, as shown in the schematic arrangement of the rodstock barrel drive assembly in FIGS. 9 and 10, the rodstock barrel drives could be used to individually drive the rodstocks into the pinning holes of the composite material. This can be done for all the rodstocks simultaneously, and the rodstocks can be driven into the pinning holes by the rodstock barrel drives such that each pinning hole is filled by a section of rodstock, which is to say each rodstock can be driven so as to reach the bottom of the pinning hole it is aligned to, thereby pinning the desired number of layers within that section of the composite material.

Figure 9:
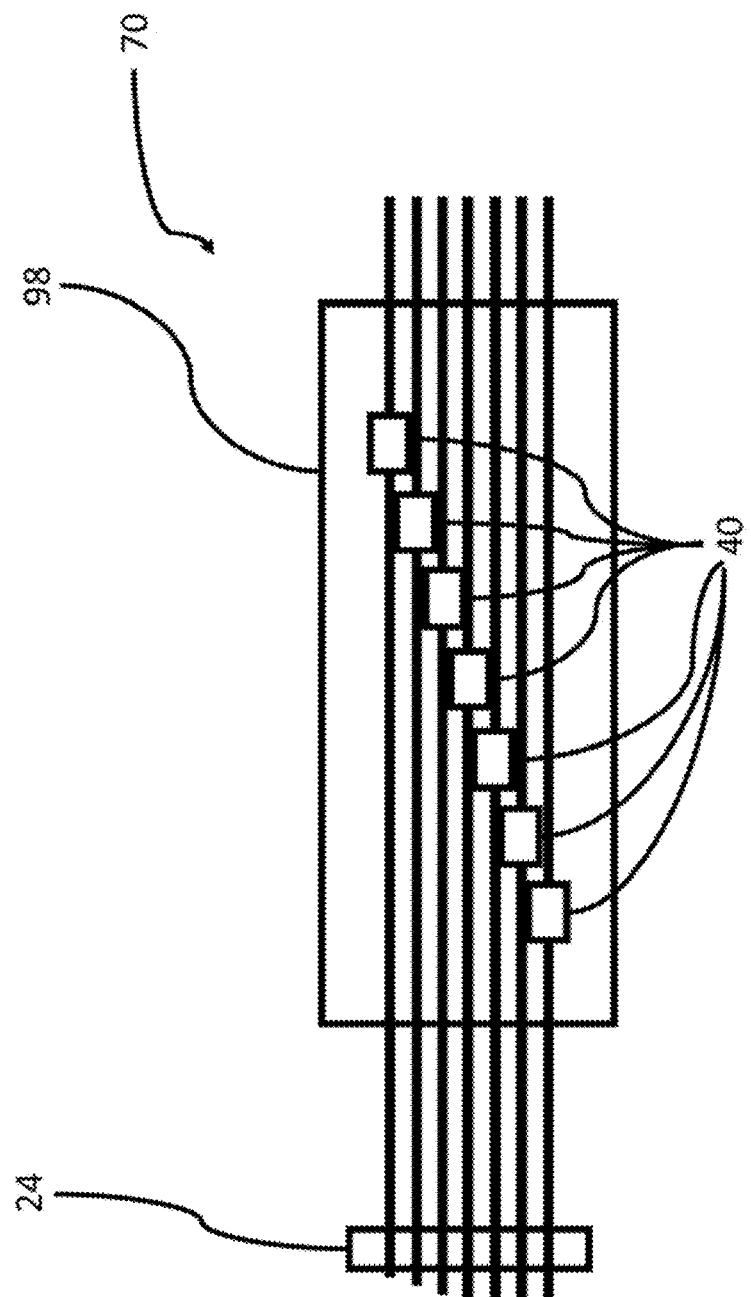
FIG. 9 is a schematic view of the rodstock drive assembly according to the second aspect of the present disclosure.
Figure 10:
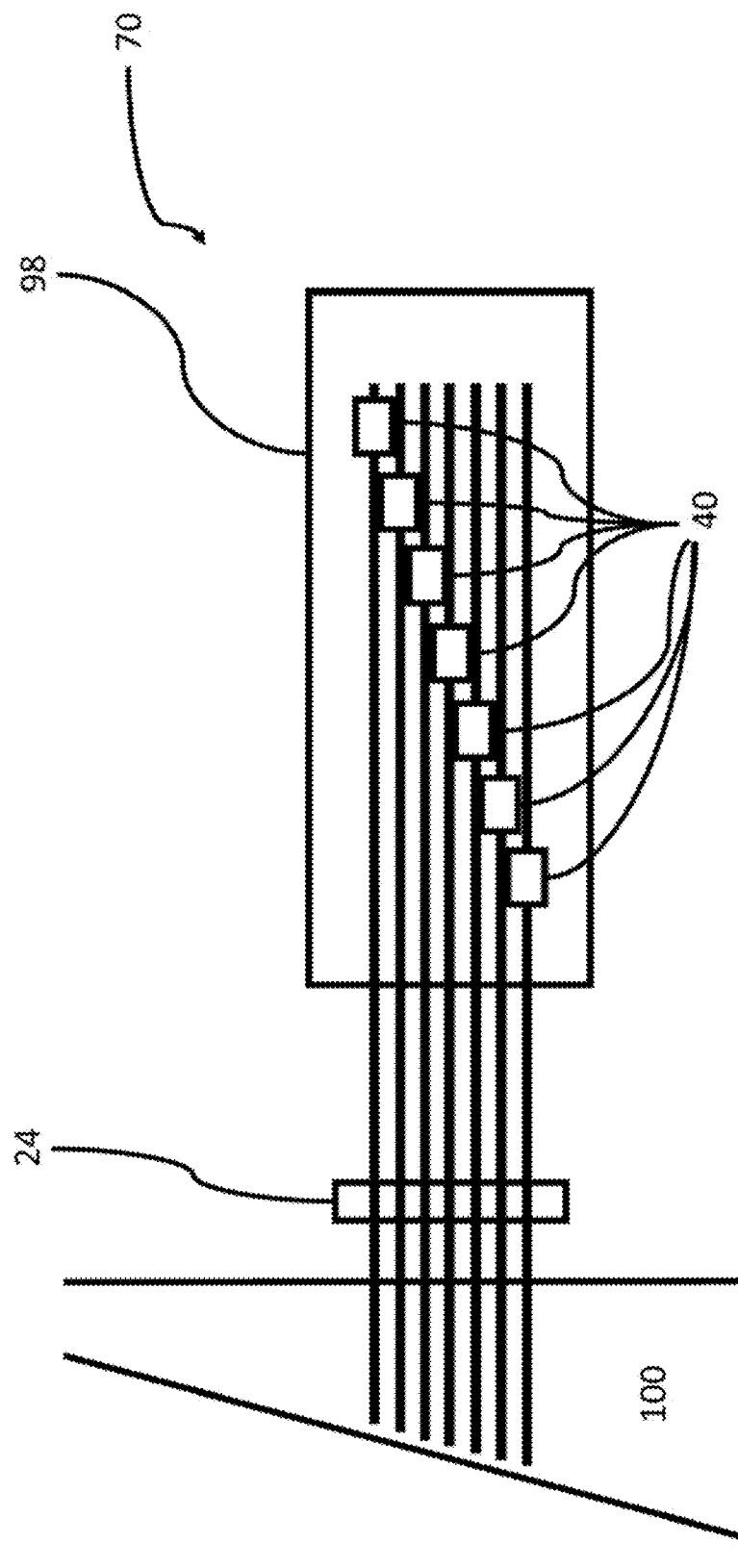
FIG. 10 is a schematic view of an alternative configuration of the rodstock drive assembly according to the second aspect of the present disclosure.
Figure 11:
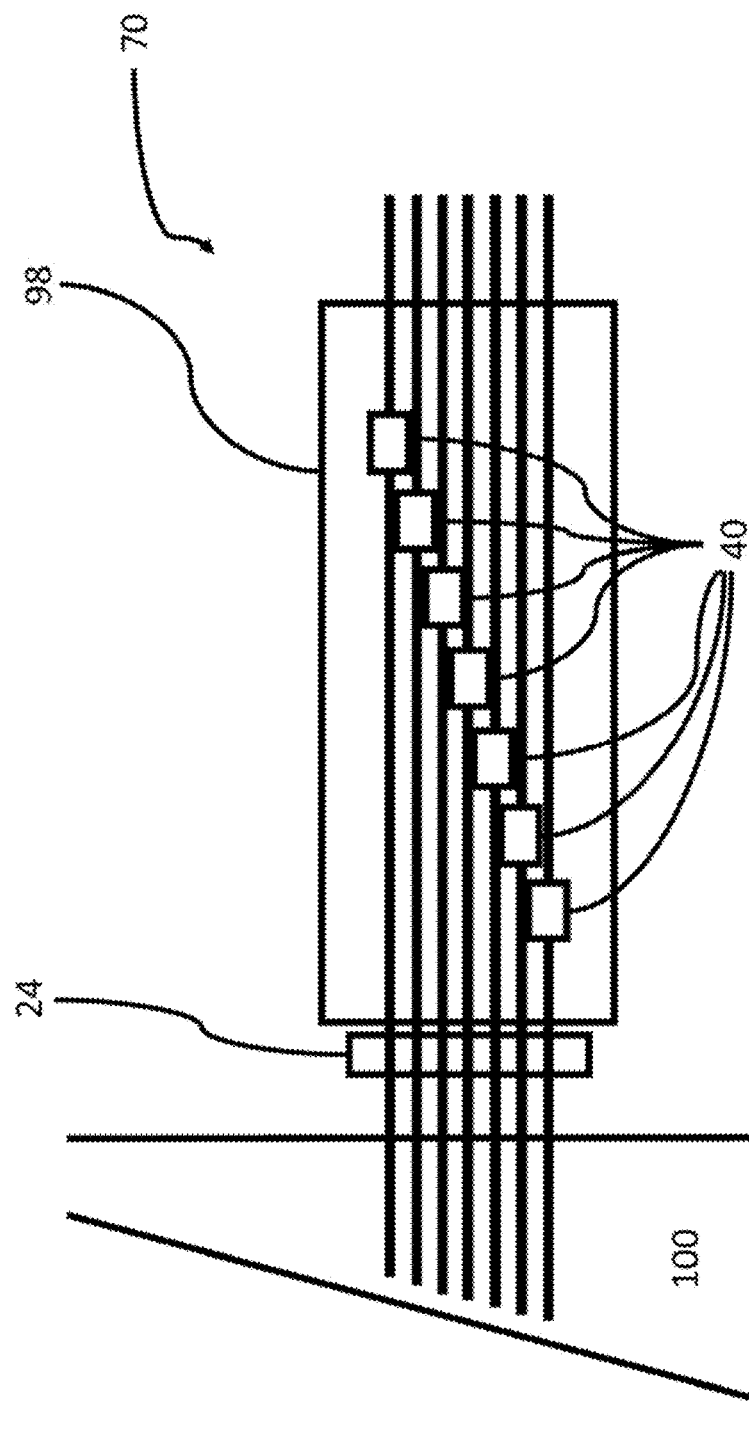
FIG. 11 is a schematic view of a second alternative configuration of the rodstock drive assembly according to the second aspect of the present disclosure.

Alternatively, as shown in FIGS. 9 and 11, the rodstock barrel drives could be used to individually position the ends of each of the rodstocks to fit the thickness profile of the composite material, i.e. to match the depth of the pinning hole it is to be inserted into, prior to be driven into the composite material by movement of the holder 20. Such a method allows for the depth profile of the rodstocks to be observed and checked against the depth profile of the composite component prior to insertion of the rodstocks into the composite component. Using the rodstock barrel drive assembly in this way, when the system mount is advanced towards the composite material, the rodstocks nearer the regions of the composite material which have been extended further penetrate deeper into the composite, ensuring that each of the layers of composite material are pinned by the rodstock.

Whichever method is used, once the rodstocks have been inserted into the pinning holes, the rodstocks can be clamped into position relative to the composite component, and then cut just above the surface of the composite component so as to leave the section of rodstock within each pinning hole. The rodstock drive assembly is then removed, and a tamping device tampens down the sections of rodstock so that the end of the rodstock which has just been cut is flush with the surface of the composite component.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A rodstock barrel drive for feeding rodstock in a rodstock drive assembly, the rodstock barrel drive comprising:
   a housing, the housing containing;
      a first roller gear and a second roller gear, the first and second roller gears each having a first toothed circumferential section, and a second circumferential section with a gripping surface such that, when installed within the housing, the teeth of the first circumferential sections of the roller gears intermesh such that rotation of one of roller gear causes rotation of the other roller gear in the opposite direction, and the second circumferential sections are configured to grip a rodstock between them so as to draw a rodstock through the space between the pair of roller gears when the roller gears rotate;
      a ring gear which engages with one of the pair of roller gears;

a drive gear which engages with the ring gear;
one or more idler gears which engage with the ring gear; and
a motor connected to the drive gear such that, upon activation, the motor rotates the drive gear, which rotates the ring gear, which rotates the pair of roller gears, which draws a rodstock through the roller gears, wherein the first roller gear, second roller gear, ring gear, drive gear, and the one or more idler gears are all positioned within, and oriented parallel to, a common plane.

2. The rodstock barrel drive of claim 1, wherein at least one of the pair of roller gears is mounted on a sprung tensioner.

3. The rodstock barrel drive of claim 1, wherein the drive gear is positioned within the circumference of the ring gear.

4. The rodstock barrel drive of claim 1, wherein the one or more of the one or more idler gears is positioned within the circumference of the ring gear.

5. A rodstock barrel drive system including a first rodstock barrel drive of claim 1 and a second rodstock barrel drive of claim 1.

6. The rodstock barrel drive system of claim 5, wherein the first and second barrel drives are aligned such that the ring gear of the first barrel drive and the ring gear of the second barrel drive share a common rotational axis.

7. The rodstock barrel drive system of claim 6, comprising at least a first motor and a second motor, the first and second motors being mounted exterior to a housing of the first rodstock barrel drive, the first motor being connected to the drive gear in the first rodstock barrel drive by a first spindle, and the second motor being connected to the drive gear in the second rodstock barrel drive by a second spindle, wherein the second spindle passes through the housing of the first rodstock barrel drive to connect with the drive gear within the housing of the second rodstock barrel drive.

8. A rodstock barrel drive assembly including a first rodstock barrel drive system of claim 5 and a second rodstock barrel drive system of claim 5.

* * * * *